United States Patent
Dapremont

(10) Patent No.: US 7,618,539 B2
(45) Date of Patent: Nov. 17, 2009

(54) SIMULATED MOVING BED CHROMATOGRAPHY FOR STRONGLY RETAINED COMPOUNDS

(75) Inventor: Olivier Dapremont, Citrus Heights, CA (US)

(73) Assignee: Ampac Fine Chemicals LLC, Rancho Cordova, CA (US)

( * ) Notice: Subject to any disclaimer, the term of this patent is extended or adjusted under 35 U.S.C. 154(b) by 0 days.

(21) Appl. No.: 12/059,651

(22) Filed: Mar. 31, 2008

(65) Prior Publication Data

US 2009/0242486 A1 Oct. 1, 2009

(51) Int. Cl.
- *B01D 15/08* (2006.01)
- *B01D 15/18* (2006.01)
- *C02F 1/28* (2006.01)

(52) U.S. Cl. ............ 210/656; 210/659; 210/198.2

(58) Field of Classification Search .......... 210/198.2, 210/656, 659

See application file for complete search history.

(56) References Cited

U.S. PATENT DOCUMENTS

| | | | |
|---|---|---|---|
| 3,476,763 A | 11/1969 | Monbaliu | |
| 3,839,325 A | 10/1974 | Hoffstadt | |
| 5,563,165 A | 10/1996 | Talley et al. | |
| 5,603,837 A | 2/1997 | Ishida et al. | |
| 6,011,177 A | 1/2000 | Archibald et al. | |
| 6,093,326 A | 7/2000 | Heikkila et al. | |
| 7,399,898 B2 * | 7/2008 | Lee et al. | 210/657 |
| 2003/0229213 A1 | 12/2003 | Farrenburg et al. | |
| 2008/0053917 A1 * | 3/2008 | Larson et al. | 210/741 |

FOREIGN PATENT DOCUMENTS

WO  WO 2007/144476 A1  12/2007

* cited by examiner

*Primary Examiner*—Krishnan S Menon
*Assistant Examiner*—Katherine Zalasky
(74) *Attorney, Agent, or Firm*—Townsend and Townsend and Crew LLP.

(57) ABSTRACT

Simulated moving bed (SMB) chromatography involving a series of columns serially connected in a circuit is performed in a modified protocol by dividing the columns into two groups isolated from flow communication with each other and using one of the two groups solely for extraction of the more strongly retained component from the solid phase while the other group is operated in the conventional SMB manner. The sites of introduction and withdrawal and the site of division between the two groups of columns are all rotated around the circuit as in conventional SMB chromatography, but the process is capable of separating component mixtures with non-linear isotherms and of extracting solutes that are very strongly retained on the solid phase.

13 Claims, 3 Drawing Sheets

SIMULATED MOVING BED CHROMATOGRAPHY FOR STRONGLY RETAINED COMPOUNDS

BACKGROUND OF THE INVENTION

1. Field of the Invention

This invention lies in the field of chromatography, and particularly the chromatographic technique known in the art as simulated moving bed chromatography (SMB).

2. Description of the Prior Art

SMB was developed to improve the performance of preparative binary separations over the separations that are achieved by traditional preparative batch chromatography. The improvement was especially sought in separations with low selectivity, i.e., those with α values of 1.1 to 2. The parameter α is the ratio of the retention factors k' of the two compounds, where k' is defined as $$\frac{t_R - t_0}{t_0}$$

in which $t_R$ is the retention time of the adsorbed species and $t_0$ is the retention time of the non-adsorbed species (the mobile phase). The retention factor k' is also the slope of the curve of the concentration of a solute adsorbed on in the stationary phase vs. its concentration in the mobile phase, and the curve itself is termed an isotherm). In SMB chromatography, the contact between the liquid phase and the solid phase is optimized, resulting in lower eluent consumption and better usage of the stationary phase, and therefore increased throughput. Enantiomers of chiral compounds are examples of binary separations that benefit from SMB chromatography; other examples will be known to those skilled in chromatography.

An effective batch-wise separation of enantiomers or of other binary mixtures that exhibit low selectivity typically requires a long column. Elution of the most retained compound from a long column requires a long period of time, however, which limits the system throughput. In packed-bed systems, long retention times require large amounts of stationary phase with the consumption of large volumes of mobile phase, and produce a high dilution of the separated species. A long column generates a high pressure drop across the bed, which in turn limits the operating flow rate in order to keep the operating pressure of the column below its prescribed maximum. Thus, while separation can be achieved in batch-wise systems, continuous systems are preferred for reasons of economy, particularly on a preparative scale.

The theory of moving bed chromatography is to optimize the use of the stationary phase by using a column configuration that places the stationary phase in a loop and effectively moves the stationary phase through the loop as the mobile phase is moving but in the opposite direction. Feed and eluent are introduced at different points in the loop, while extract (the more strongly retained component) and raffinate (the weakly retained component) are withdrawn at still further points in the loop that alternate with the introduction points of feed and eluent. This effectively creates counter-current flows of stationary and mobile phases.

Actual implementation of the moving bed theory requires a fixed bed, which in practical terms cannot be moved through an elongated column, particularly one that is circuitous in configuration, even when the "column" is actually a series of individual columns joined together to form the loop. The solution would appear to be to rotate the column itself, thereby avoiding any disturbance to the bed, while maintaining the points of introduction of feed and eluent and of withdrawal of extract and raffinate stationary, or alternatively, to hold the column and the bed stationary and rotate the points of introduction and withdrawal continuously around the column loop. With either alternative, a system strictly following the moving bed model would require that the points of introduction and of withdrawal continuously rotate relative to the column loop. This is likewise impractical.

Simulated moving bed chromatography removes all such impracticalities by using both a stationary column loop and stationary ports distributed around the loop, with each port capable of both introduction and withdrawal. The column loop is operated in stages, reconnecting the ports between each stage by switching valves to change the functions of the ports as introduction and withdrawal sites. For a selected time interval, therefore, the feed introduction, eluent introduction, extract withdrawal, and raffinate withdrawal ports will be located at distinct sites around the column loop, and for each succeeding time interval, these sites will be advanced by increments around the loop in the direction of flow of the eluent, thereby simulating a moving bed. Each port thus alternates between serving as an inlet and as an outlet, and between the two types of inlet as well as the two types of outlet. Descriptions of SMB chromatography can be found in Miller, L., et al., "Chromatographic resolution of the enantiomers of a pharmaceutical intermediate from the milligram to the kilogram scale," *J. Chromatog. A*, 849(2), 309-317 (1999), Negawa, M., et al., U.S. Pat. No. 5,434,298 (issued Jul. 18, 1995); Nagamatsu, S., et al., U.S. Pat. No. 6,217,774 (issued Apr. 17, 2004); Ikeda, H., U.S. Pat. No. 6,372,127 (issued Apr. 16, 2002); Ikeda, H., et al., U.S. Pat. No. 6,533,936 (issued Mar. 18, 2003); Ohnishi, A., et al., United States Patent Application Publication No. US 2005/0054878 (published Mar. 10, 2005); Cavoy, E., et al., "Laboratory-developed simulated moving bed for chiral drug separations—Design of the system and separation of Tramadol enantiomers," *J. Chromatog.* A 769, 49-57 (1997); and *Chiral Separation Techniques—A Practical Approach*, 3d ed., Subramanian, G., ed., Wiley-VCH Verlag GmbH & Co. KGaA, Wernheim, Germany (2007).

In applications of SMB chromatography, the column loops are formed by a series of individual columns connected in series, with the introduction/withdrawal ports located between columns. The span of packed bed between each pair of adjacent ports is typically termed a "zone," the four ports thus separating the columns into four zones that move around the circuit as the various port functions are rotated. The zone between the eluent introduction and the extract withdrawal is typically referred to as Zone I; with Zone II being the zone between the extract withdrawal and the feed introduction, Zone III being the zone between the feed introduction and the raffinate withdrawal, and Zone IV being the zone between the raffinate withdrawal and the eluent introduction. Each zone can be occupied by as little as a single column, but most often a zone consists of two or more columns to allow the stepwise advances that are smaller distances than the length of an entire zone. This permits the system to more closely approach the model of a true moving bed (TMB), but it also allows the system to be operated with zones of different bed lengths (i.e., different numbers of columns from one zone to the next), and to be operated in an asynchronous manner (commonly known as "Varicol"), i.e., by switching different port functions at different times rather than all at the same time, or under cyclic flow modulation wherein the flow rates are allowed to change during a switching period (commonly known as "Power-Feed").

Regardless of the operational protocol of an SMB system, the system is limited by pressure drop considerations, since the overall pressure drop includes contributions from the pressure drops in each of the four zones. Limitations on the pressure drop impose limitations on the throughput, which can present a problem when separating mixtures with high a, i.e., those in which one component is much more strongly retained by the stationary phase than the other. In batch separations, a component that is strongly retained, such as in a mixture with α>4, can be recovered by using a short column, a solvent gradient, or both, to reduce the elution time. If one were to separate the same mixture in a continuous SMB operation, the separation would require a high flow rate in Zone I. If one also sought a high rate of feed mixture through the SMB system, one would run Zones II and III at their highest possible flow rates. This would be limited however by the pressure drop in Zone I. Thus, in conventional SMB systems, separating mixtures that include a strongly retained component by running Zone I at a high pressure drop while keeping the overall pressure drop within the system limit leaves with little room for pressure drops in Zones II and III and thereby compromises the throughput rate.

SUMMARY OF THE INVENTION

It has now been discovered that simulated moving bed chromatography can be performed in a manner that uses a high flow rate of eluent through the portion of the system where the more strongly retained component is the most purified, without imposing limitations on the flow rates through the remaining portions of the system, and without requiring excessive pressure drops across any portions of the system. The process is performed on SMB systems (including variations such as the Varicol and PowerFeed systems) having the same column and valve arrangements as those used in SMB systems described above, with at least four columns separated by multifunctional ports governed by multi-way valves, and rotation of the port functions by appropriate valve switching. The invention however resides in operating the system in a parallel-stream manner, such that within individual stages of operation, the inlet and outlet valves are arranged to divide the columns into at least two groups isolated from flow communication with each other. A division into only two groups that collectively utilize all columns simultaneously is preferred. The eluent introduction, extract withdrawal, feed introduction, and raffinate withdrawal sites of conventional SMB systems define the first group, while a separate set of eluent introduction and withdrawal sites defines the second group, enabling additional extract recovery at the withdrawal site of the second group. Rotation of the site functions among fixed ports is still performed as in conventional SMB, but flow through the two groups is maintained both separate and simultaneous at each stage.

These and other features, advantages, and embodiments of the invention will be apparent from the descriptions that follow.

DETAILED DESCRIPTION OF THE INVENTION AND PREFERRED EMBODIMENTS

Figure 1A:
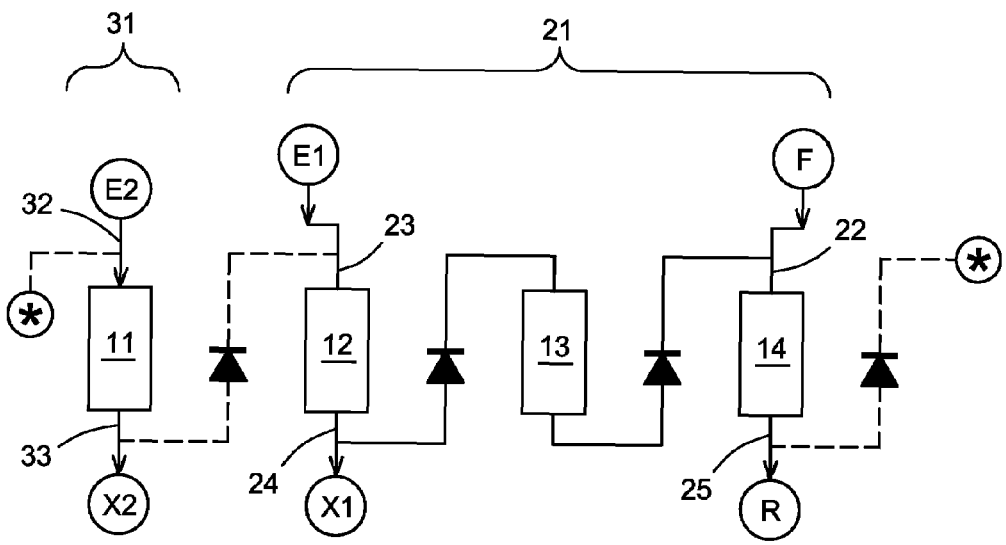
FIG. 1a is a diagram of the first stage of a four-stage cycle implementing a simulated moving bed chromatographic process of the present invention.
Figure 1B:
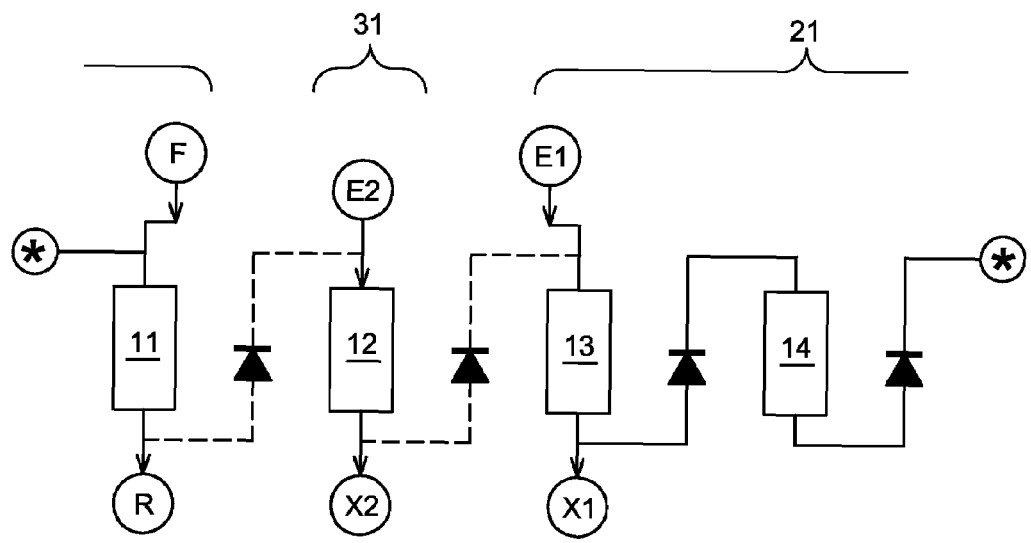
FIG. 1b is a diagram of the second stage of the cycle.
Figure 1C:
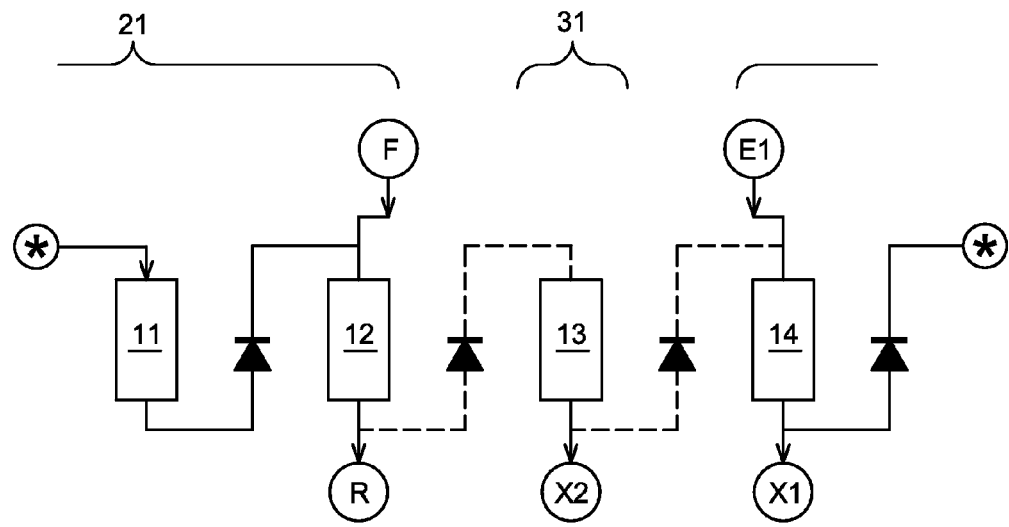
FIG. 1c is a diagram of the third stage of the cycle.

The term "SMB system" is used herein to denote the combination of fixed-bed columns, inlet and outlet valve manifolds, sources of feed mixture and of eluent, and mechanism for the timed switching of flows through the inlet and outlet manifolds, by way of which simulated moving bed chromatography is practiced. A typical SMB system is thus one that contains a plurality of packed-bed columns serially connected in a circuit, each column having an inlet manifold arranged to direct incoming flow from a plurality of inlet lines to the column and an outlet manifold arranged to direct flow emerging from the column to a plurality of discharge lines;

a feed source of a liquid solution containing the species to be separated;

an eluent source; and a controller for all inlet and outlet valve manifolds that forms flow paths communicating each column with a selected inlet line and a selected discharge line, and for changing the inlet and discharge lines so selected at preselected time intervals.

A single manifold can serve as both the outlet manifold of one column and the inlet manifold of another. The inlet manifold associated with each column preferably joins the column with at least three, and more preferably only three, inlet lines, while the outlet manifold associated with each column likewise preferably joins the column with at least three, and more preferably only three, discharge lines. Selections among the various lines in each manifold are achieved by conventional means, such as a remotely controlled on-off valve on each line or a remotely controlled multi-way valve.

According to the process of the present invention, the valve positions in each of the inlet and outlet manifolds are first configured to isolate a first group of columns from flow communication with a second group. Each group of columns will then have an upstream end and a downstream end. The columns can be divided into three or more isolated groups rather than just two, but division into two groups is preferred. Once the valve positions are configured in this manner, feeds and withdrawals are performed simultaneously as follows:

In the first group of columns: (i) eluent is fed at an inlet manifold at the upstream end, (ii) extract is withdrawn at an outlet manifold between the upstream end and the downstream end, (iii) the liquid solution of components to be separated is fed through an inlet manifold between the extract withdrawal site and the downstream end, and (iv) raffinate is withdrawn through an outlet manifold at the downstream end, while eluent is passed through the second group of columns by feeding eluent to the upstream end of the second group and collecting eluent emerging from the downstream end. The flow rate of eluent through the second group is great enough to allow for complete elution of the most retained compound within the time allocated by the selected switching time of the SMB system. The flow rate through the second group can be fixed or variable, but using a flow rate that exceeds the average flow rate through the first group is preferred.

After a selected time interval (referred to as the "switch time" of the system), the valve positions in the inlet and outlet manifolds are reconfigured to advance all feed and withdrawal sites, and the divisions between the first and second groups of columns, in a common direction around the circuit, which is the same direction as the eluent flow. The new configuration is maintained for another selected time interval, which can either be of the same duration as the first or of a different duration, and the various sites of feeding and withdrawal, and the divisions between the two groups of columns, are advanced again. These incremental advancements are continued as feed solution continues to be supplied to the system, and the result is a simulated continuous-flow system like that of conventional SMB. The pattern of introduction and withdrawal thus rotates around the column circuit in the same manner as the pattern movement in conventional SMB, but the pattern itself differs in the present invention by including the flow divisions that close off flow between the two groups of columns and that rotate with the introduction and withdrawal sites, and further by including two eluent introduction sites and two extract withdrawal sites, all of which operate concurrently with the feed introduction and raffinate withdrawal sites (between switch times).

For convenience, the eluent introduction site to the first group is referred to herein as the first introduction site, the extract withdrawal site in the first group as the first withdrawal site, the feed introduction site in the first group as the second introduction site, the raffinate withdrawal site in the first group as the second withdrawal site, the eluent introduction site to the second group as the third introduction site, and the extract withdrawal site in the second group as the third withdrawal site.

The expression "group of columns" is used herein to denote as little as one column (i.e., a single unitary column with a continuous packed bed of solid phase), or even only part of one column, or two or more columns. The expression "adjacent pair" in reference to introduction and withdrawal sites is used herein to refer to any pair of introduction and withdrawal sites that have no further introduction or withdrawal sites between them in the direction of eluent flow. Likewise, the number of columns between any such adjacent pair can be either one column or two or more columns. The number of columns between any one adjacent pair can be the same as or different from the number of columns between any other adjacent pair. In preferred embodiments of the invention, the number of columns between each adjacent pair of introduction/withdrawal sites, whichever such site is first in the direction of eluent flow, is from one to six, and more preferably one to three. For the first and second groups of columns, the number of columns in the first group (which includes feed introduction at the second introduction site and raffinate withdrawal at the second withdrawal site) is preferably from three to twelve, and more preferably from three to nine, while the number of columns in the second group (which does not include a feed introduction site nor a raffinate withdrawal site) is preferably from one to four, more preferably one or two. The total number of columns in the system preferably ranges from four to sixteen, and more preferably from four to eight.

The terms "extract" and "raffinate" are used herein as they are in conventional SMB terminology. Thus, "extract" denotes a fraction of the initial liquid mixture that contains the component(s) that is/are more strongly retained on the solid phase relative to the other component(s) and that elute(s) in a relatively purified form, i.e., relatively isolated from the less strongly retained component(s). The term "raffinate" denotes a fraction of the initial liquid mixture that contains the component(s) that is/are retained relatively weakly on the solid phase and that elute(s) in a relatively purified form, i.e., relatively isolated from the strongly retained component(s). The expression "serially connected in a circuit" in reference to the various columns in the SMB system denotes that the columns are joined by fluid transfer conduits through inlet and outlet manifolds that can be arranged to cause the discharge from each column to be fed to an adjacent column in the series in an endless loop. This is true despite the fact that in the practice of the present invention, the valves on the inlet and outlet manifolds at any single stage of operation are positioned to isolate the two groups of columns from each other and to form two parallel flow-through sub-systems.

The present invention is operated in preferred embodiments with a single introduction site and a single withdrawal site in the second group of columns (which may contain a single column), as compared to three zones separated by introduction and withdrawal sites in the first group of columns (which will contain three or more columns), each zone operating at a different flow rate due to the intermediate introduction or withdrawal sites. The term "average flow rate" in reference to the first group of columns denotes the total of the flow rates through all columns of the first group divided by the number of columns in the first group. While the flow rates through the various portions of the system can vary widely at individual stage of operation, the present invention offers the advantage of allowing the use of a flow rate through the second group of columns that substantially exceeds the average flow rate through the first group of columns. The ratio of the flow rate through the second group to the average flow rate through the first group preferably ranges from about 1.0 to about 20.0, more preferably from about 2.0 to about 10.0, and most preferably from about 2.5 to about 6.0.

The process of the invention is preferably operated at flow rates that produce a pressure drop across the second group of columns that is from about 1.0 to about 2.0 times, more preferably from about 1.0 to about 1.5 times, and most preferably from about the same as the pressure drop across the second group.

While conventional SMB systems include an internal recycle stream, causing the systems to operate in part as closed-loop systems, preferred implementations of the present invention do not include recycle streams and thereby operate in an open-loop manner. Thus, in preferred embodiments, all liquid emerging from the downstream end of the first group of columns is withdrawn as the raffinate, and the system is operated without a zone corresponding to Zone IV of the SMB systems of the prior art.

Variations that have been developed in the practice of SMB processes of the prior art can be applied in an analogous manner to the process of the present invention. Thus, in the various changes of functions of the multifunctional ports, the isolation points separating the two groups of columns and all introduction and withdrawal sites can be advanced either simultaneously or in an asynchronous or staged manner (as in the Varicol variation) or at variable flow rates (as in the PowerFeed variation). Simultaneous advancement is generally preferred.

Operating parameters of the system, such as time intervals between advancements of the various introduction and withdrawal sites, the lengths and widths of individual columns, pump pressures, and the mass or volumetric flow rate through each column, will generally be within the ranges used in SMB systems of the prior art, although with a higher flow rate through the second group of columns. Typical columns are packed-bed columns with lengths ranging from 5 to 15 and diameters ranging from 2 mm to 1,600 mm. Volumetric relative flow rates calculated per unit column cross section will generally be between 0.5 mL/min/cm$^2$ and 40 mL/min/cm$^2$; pump pressures will generally be between 2 bar and 60 bar, and switch times will generally be from about 0.15 minutes to about 15 minutes.

While the present invention can be implemented in a variety of ways, a full understanding of its basic concepts and how they can be implemented can be obtained by examination of one example. Such an example is shown in the drawings.

FIGS. 1a through 1d represent the individual stages, respectively, of a four-stage cycle in which each adjacent pair of introduction/withdrawal sites is separated by one column. The entire solid phase thus resides in four columns 11, 12, 13, 14, joined to form a circuit. In each of the diagrams, the asterisk on the right side of the diagram joins the asterisk on the left side to complete the circuit, the check valves indicate the direction of flow through the circuit, the solid lines connecting the columns represent lines of liquid flow, and the dashed lines represent lines that are closed and not in use (i.e., liquid residing in these lines is not moving). While the inlet and outlet manifolds are not shown in FIGS. 1a through 1d, the flow paths shown by the various solid lines are achieved by appropriate positions of the valves in the manifolds.

In the first stage of the cycle (FIG. 1a), the valve positions are arranged such that the three columns on the right 12, 13, 14, are in flow communication to define the "first group" 21 as this term is used above. The solution containing the components to be separated, identified as the "feed" and indicated in the diagram by the symbol F, is introduced at the inlet 22 to the last column 14 in the first group (i.e., between the middle column 13 and the last column 14); the eluent, indicated in the diagram by the symbol E1, is introduced at the entry 23 of the first column 12 in the first group; the extract, indicated in the diagram by the symbol X1, is withdrawn at a withdrawal point 24 between the first column 12 and the middle column 13 in the first group, and the raffinate 25, indicated in the diagram by the symbol R, is withdrawn at the outlet 25 from the last column 14 in the group. In this example, the raffinate 25 constitutes the entire stream passing through the last column 14, and there is no recycle stream from the last column 14 to the first column 12 to supplement the eluent supply 23. While the streams are flowing into, out of, and through the first group 21 of columns, the column 11 on the extreme left of the diagram is defined as the "second group" 31 and is isolated from the first group, as indicated by the dashed lines. Both ends of the column 11 therefore serve as points of isolation of the column from the other columns. A supply of eluent, indicated by the symbol E2 and independent of the eluent supply E1 to the first group of columns, is introduced at the inlet 32 to the column, and an extract indicated by the symbol X2, is withdrawn at the outlet 33 of the column. The rate of introduction of eluent E2 at the column inlet 32 is substantially greater than the flow rates through any of the three columns in the second group 21, to achieve elution of the strongly retained component in the extract X2. Extract is thus withdrawn from the system in two portions X1 and X2, which may ultimately be combined as a product.

Figure 1D:
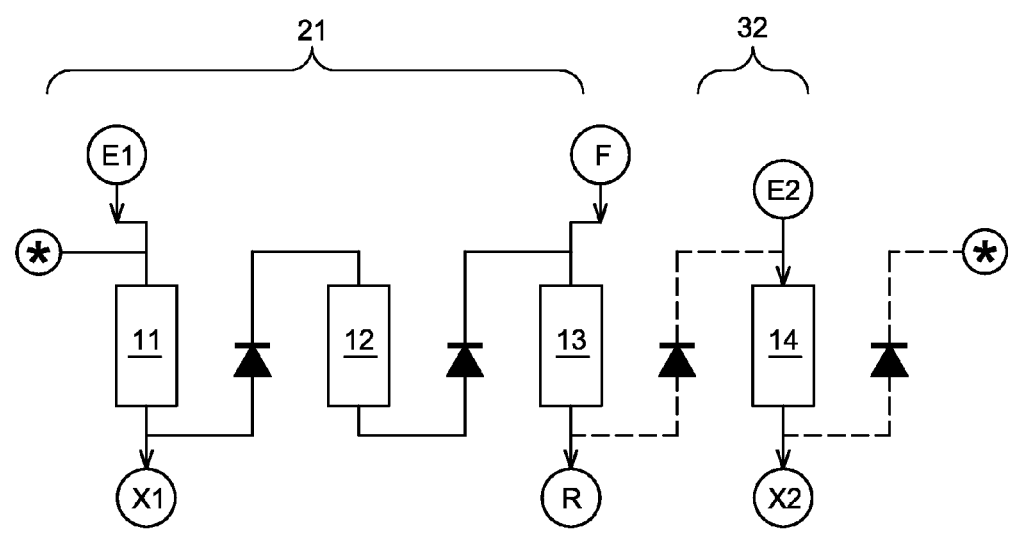
FIG. 1d is a diagram of the fourth stage of the cycle.

In the second stage of the cycle (FIG. 1b), the valve positions are shifted ("switched") such that the first, third, and fourth columns 11, 13, 14, according to the view shown in the diagram, are joined to constitute the "first group" 21 and the second column 12 is isolated from the other columns to serve as the "second group" 31. The isolation, introduction, and withdrawal sites are thus all advanced by a distance of one column length in the direction of eluent flow. Corresponding advances are made for the third stage (FIG. 1c) and the fourth stage (FIG. 1d). An advance following the fourth stage returns the system to the first stage (FIG. 1a) and the cycle is repeated.

Figure 2:
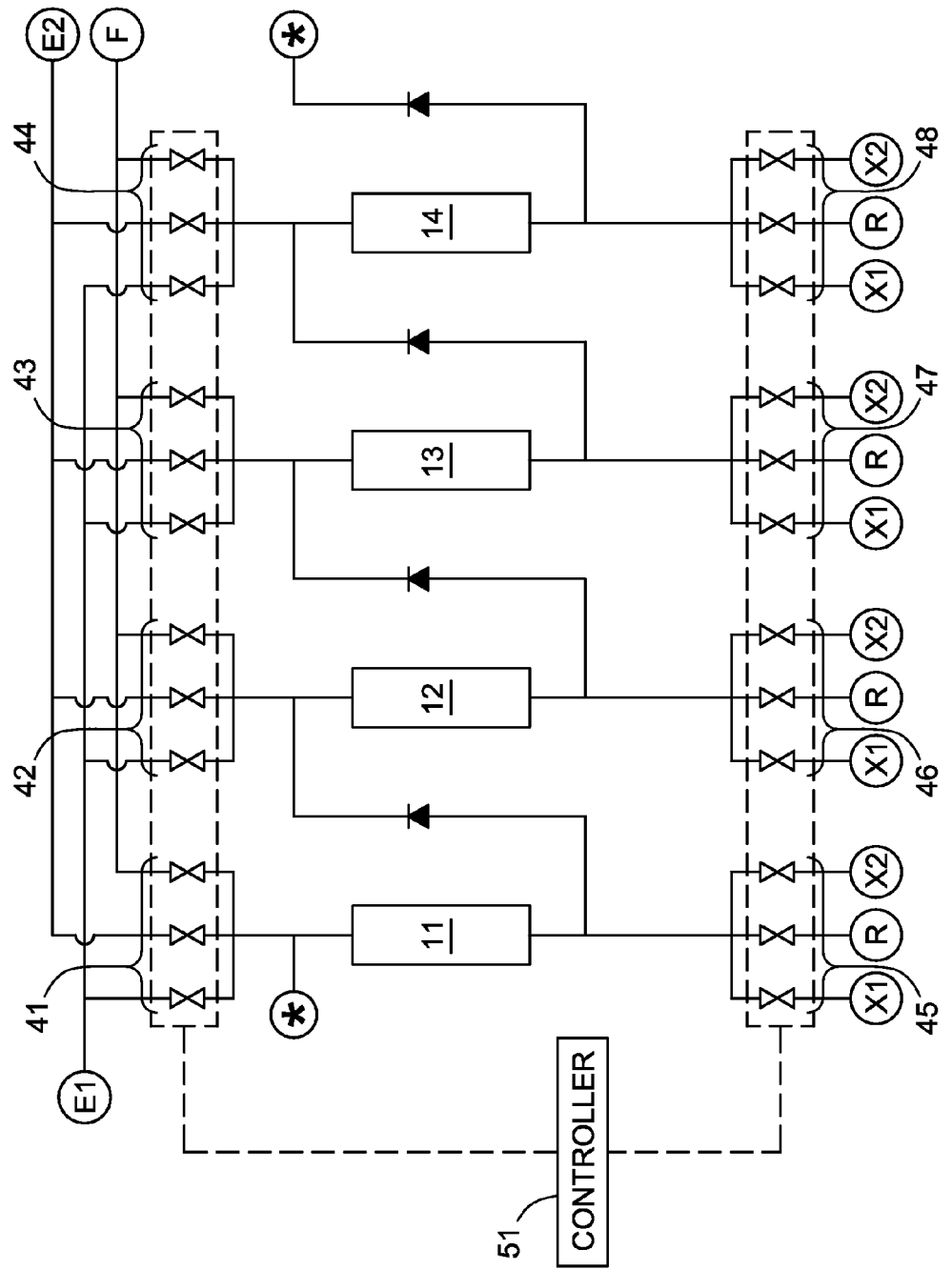
FIG. 2 is a diagram of a system of chromatographic columns and inlet and outlet manifolds on which the cycle of FIGS. 1a through 1d can be performed.

FIG. 2 is a diagram showing examples of inlet and outlet manifolds that allow the cycle of FIGS. 1a, 1b, 1c, and 1d to be performed. Each inlet manifold 41, 42, 43, 44 offers a choice between the feed F and the two eluent feeds E1, E2, and each outlet manifold 45, 46, 47, 48 offers a choice between the raffinate R and the two extracts X1, X2. A system controller 51 controls the positions of the valves and the switch time. The controller software can be any of known software programs for laboratory instrumentation. Examples are VISUAL BASIC (Microsoft, Redmond, Wash., USA) and LABVIEW (National Instruments, Austin, Tex., USA).

As noted above, variations on the cycle described above in connection with FIGS. 1a, 1b, 1c, and 1d include (1) recycling a portion of the extract stream X1 to the eluent introduction stream E1; (2) replacing each individual column in this example with two or more columns; (3) using a different number of columns in each zone (i.e., between each adjacent pair of introduction/withdrawal sites); (4) switching different introduction and withdrawal sites at different times rather than simultaneously (the Varicol technique); and (5) changing the flow rates at different times in the cycle (the PowerFeed technique). Furthermore, while a zone corresponding to Zone IV of conventional SMB systems is lacking from the system and protocol described in connection with this figures, such a zone can indeed be included as a further variation. Preferred systems of this invention, however, do not include either a recycle stream or a zone corresponding to Zone IV. Still further variations will be apparent to those skilled in SMB systems.

In the claims appended hereto, the term "a" or "an" is intended to mean "one or more." The term "comprise" and variations thereof such as "comprises" and "comprising," when preceding the recitation of a step or an element, are intended to mean that the addition of further steps or elements is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for separating species in a liquid solution into an extract and a raffinate in a simulated moving bed chromatographic system, said system comprising:

a plurality of packed-bed columns serially connected in a circuit, each column having an inlet manifold arranged to direct incoming flow from a plurality of inlet lines to said column and an outlet manifold arranged to direct flow emerging from said column to a plurality of discharge lines, a feed source of said liquid solution, an eluent source, and means for controlling all of said inlet and outlet manifolds to form flow paths communicating each said column with a selected inlet line and with a selected discharge line, and for changing said selected inlet and discharge lines at preselected time intervals, said process comprising:

(a) configuring said inlet and outlet manifolds by said valve control means to isolate a first group of said columns from flow communication with a second group of said columns, each group providing continuous flow from one column to the next within a single group and each group having an upstream end and a downstream end collectively defining a direction of fluid flow around said circuit,
  (b) with said manifolds so configured, performing steps (i) through (v) below simultaneously:
    (i) feeding eluent from said eluent source to said first group of columns through an inlet manifold at said upstream end of said first group, said upstream end defined as a first introduction site;
    (ii) withdrawing extract from said first group of columns through an outlet manifold at a first withdrawal site between said upstream and downstream ends of said first group;
    (iii) feeding said liquid solution from said feed source to said first group of columns through an inlet manifold, defined as a second introduction site, between said first withdrawal site and said downstream end of said first group;
    (iv) withdrawing raffinate from said first group of columns through an outlet manifold at said downstream end of said first group, said downstream end defined as a second withdrawal site; and
    (v) passing eluent through said second group of columns at a flow rate substantially exceeding the average flow rate through said first group of columns, by feeding eluent to said upstream end of said second group and collecting said eluent emerging at said downstream end of said second group as additional extract, said upstream end of said second group defined as a third introduction site and said downstream end defined as a third withdrawal site;
  (c) after a selected time interval, reconfiguring said inlet and outlet valve manifolds by said means for controlling to advance all introduction and withdrawal sites, and thereby the columns forming said first and second groups, in said direction of flow,
  (d) repeating steps (b) and (c) until all species in said liquid mixture are divided between said extract and said raffinate.

2. The process of claim 1 wherein said flow rate of eluent passing through said second group of columns in step (v) is a maximum of about 20.0 times the average flow rate through said first group of columns.

3. The process of claim 1 wherein said flow rate of eluent passing through said second group of columns in step (v) is from about 2.0 to about 10.0 times the average flow rate through said first group of columns.

4. The process of claim 1 wherein said flow rate of eluent passing through said second group of columns in step (v) is from about 2.5 to about 6.0 times the average flow rate through said first group of columns.

5. The process of claim 1 wherein said raffinate withdrawn from said first group of columns in step (iv) consists of all fluid emerging from said downstream end of said first group of columns.

6. The process of claim 1 wherein step (c) is performed by advancing all introduction and withdrawal sites simultaneously.

7. The process of claim 1 wherein step (b) creates pressure drops across said first and second groups of columns, and wherein said pressure drop across said second group of columns is from about 1.0 to about 2.0 times said pressure drop across said first group of columns.

8. The process of claim 1 wherein step (b) creates pressure drops across said first and second groups of columns, and wherein said pressure drop across said second group of columns is from about 1.0 to about 1.5 times said pressure drop across said first group of columns.

9. The process of claim 1 wherein said system comprises from one to six columns between each introduction site and the closest withdrawal site in said circuit.

10. The process of claim 1 wherein said system comprises from one to three columns between each introduction site and the closest withdrawal site in said circuit.

11. The process of claim 1 wherein said system has a total of from four to sixteen columns.

12. The process of claim 1 wherein said system has a total of from four to eight columns.

13. The process of claim 1 wherein each introduction site and the closest withdrawal site in said circuit is defined as an adjacent pair of introduction/withdrawal sites, and the number of columns between each adjacent pair of introduction/withdrawal sites is not equal among all such adjacent pairs.

* * * * *